United States Patent
Wolf

(10) Patent No.: US 9,501,945 B2
(45) Date of Patent: Nov. 22, 2016

(54) SYSTEM AND METHOD FOR TRACKING DEVELOPMENTAL TRAINING

(71) Applicant: Verizon Patent and Licensing Inc., Arlington, VA (US)

(72) Inventor: Rebecca A. Wolf, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 236 days.

(21) Appl. No.: 14/292,333

(22) Filed: May 30, 2014

(65) Prior Publication Data
US 2015/0347412 A1 Dec. 3, 2015

(51) Int. Cl.
G06F 17/30 (2006.01)
G09B 7/02 (2006.01)
G06Q 10/00 (2012.01)
G06Q 50/20 (2012.01)

(52) U.S. Cl.
CPC ........... G09B 7/02 (2013.01); G06F 17/30699 (2013.01); G06Q 10/00 (2013.01); G06Q 50/20 (2013.01)

(58) Field of Classification Search
None
See application file for complete search history.

(56) References Cited

U.S. PATENT DOCUMENTS

| | | | | |
|---|---|---|---|---|
| 5,980,429 A * | 11/1999 | Nashner | ............... | A61B 5/1036 434/247 |
| 7,293,025 B1 * | 11/2007 | Harouche | ................ | G09B 7/00 |
| 8,628,331 B1 * | 1/2014 | Wright | .................... | G09B 19/00 434/107 |
| 9,025,824 B2 * | 5/2015 | Stephenson | ........ | A63B 24/0003 348/135 |
| 2004/0166484 A1 * | 8/2004 | Budke | .................... | G09B 19/00 434/433 |
| 2007/0281287 A1 * | 12/2007 | Marioneaux | ....... | G06Q 10/0639 434/353 |
| 2008/0299524 A1 * | 12/2008 | Murrell | .................... | G09B 7/02 434/219 |
| 2011/0070572 A1 * | 3/2011 | Miller | ....................... | G09B 7/02 434/322 |
| 2011/0229860 A1 * | 9/2011 | Leventhal | ............... | A63F 13/12 434/107 |
| 2011/0229864 A1 * | 9/2011 | Short | ....................... | G09B 7/00 434/219 |
| 2013/0171594 A1 * | 7/2013 | Gorman | ................... | G09B 5/00 434/219 |
| 2013/0223707 A1 * | 8/2013 | Stephenson | ........ | A63B 24/0003 382/128 |
| 2014/0272833 A1 * | 9/2014 | Gupta | .................... | G06Q 10/10 434/219 |

* cited by examiner

*Primary Examiner* — Hung Le

(57) ABSTRACT

An approach is provided for receiving an input for specifying a developmental training activity associated with a user. The approach involves identifying a classification of the developmental training activity as a team activity, an individual activity, or a combination thereof. The approach also involves determining a weighting for the development training activity based on classification. The approach further involves calculating a training score for the user based on the weighting and the developmental training activity.

20 Claims, 12 Drawing Sheets

SYSTEM AND METHOD FOR TRACKING DEVELOPMENTAL TRAINING

BACKGROUND INFORMATION

The global competition and the rapidly changing technology emphasize the importance of human capital within an establishment. In an economy with rising uncertainty knowledge seems to be the only reliable source of sustained competitive advantage. Knowledge is becoming basic capital and the trigger of development, hence users are in constant need of improved methods of training to maximize efficiency and quality. Regardless of the known importance of a regular training process, the current training approaches are minimal and sporadic in nature. An approach for encouraging regular participation in developmental training activities by one or more users is required for advancing knowledge and skills.

Therefore, a method for calculating a training score by evaluating the developmental training activity performed by a user to generate a ranking is necessary for encouraging user participation.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

An apparatus, method, and software for calculating a training score by evaluating the developmental training activity performed by a user to generate a ranking, is described. In the following description, for the purposes of explanation, numerous specific details are set forth in order to provide a thorough understanding of the present invention. As is well known, the present invention may be practiced without these specific details or with an equivalent arrangement. In other instances, well-known structures and devices are shown in block diagram form in order to avoid unnecessarily obscuring the present invention.

Figure 1:
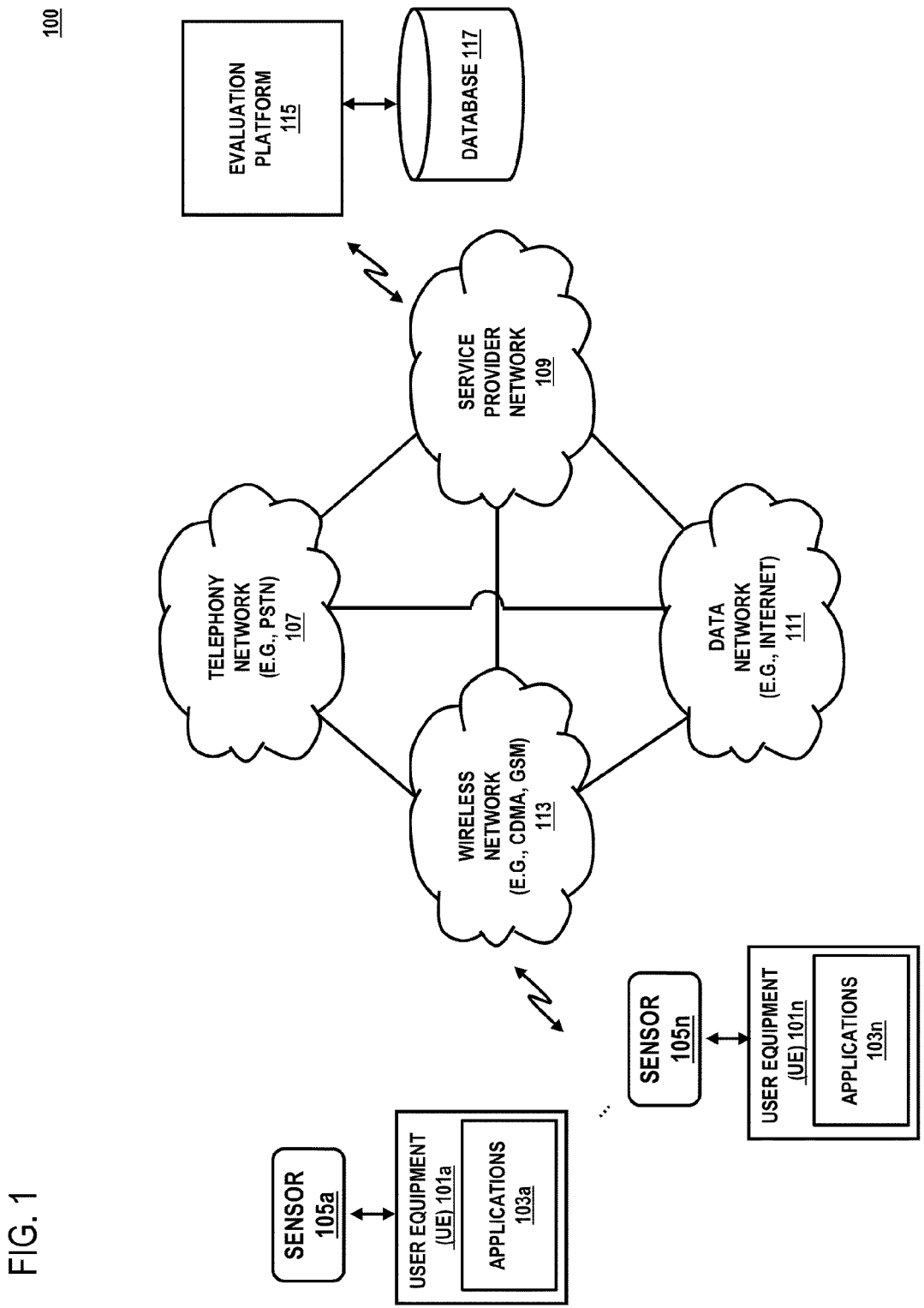
FIG. 1 is a diagram of a system capable of calculating a training score by evaluating the developmental training activity performed by a user to generate a ranking, according to one embodiment.

As shown in FIG. 1, the system 100 comprises user equipment (UE) 101a-101n (collectively referred to as UE 101) that may include or be associated with applications 103a-103n (collectively referred to as applications 103) and sensors 105a-105n (collectively referred to as sensors 105). In one embodiment, the UE 101 has connectivity to the evaluation platform 115 via networks 107-113. In one embodiment, the evaluation platform 115 performs one or more functions associated with calculating a training score by evaluating the developmental training activity performed by a user to generate a ranking.

As discussed earlier, with the rapidly changing technologies there is constant need for novel and improved methods of motivating users to continue training. In one scenario, the managers and/or employers may grant bonus scores to encourage employees to participate in regular training activities in order to continuously advance their knowledge and skills. Needless to mention, overall improvement in efficiency of an establishment is the result of consistent and continuous training and high-levels of collaboration between the employees. Training is of growing importance to companies seeking to gain an advantage among competitors. Companies that are constantly creating novel modes of training their employees on technological advancement develop excellent services. In one scenario, users often stop their training in the middle or after passing a certain milestone. It is very important to encourage them to participate in a training activity in a continuous basis. In view of that, continuous training of employees is important given the knowledge and skill intensive jobs and the influence of technology on the job content.

To address this problem, a system 100 of FIG. 1 introduces the capability to calculate a training score by evaluating the developmental training activity performed by a user to generate a ranking to encourage user participation. In one scenario, a web based application may be accessed by one or more users through their respective mobile devices to perform a developmental training activity. The training undertaken by one or more users may be evaluated and validated by the system 100. Subsequently, system 100 may generate a score based on the performance of the users during their training to cause a ranking. In one scenario, user performance may be based on user productivity, user participation, quality of work, user progress, or a combination thereof. Subsequently, system 100 may cause a presentation of a scoreboard indicating relative ranking of one or more users made accessible to other users via a network service. In one scenario, scores may be calculated based, at least in part, on the ratio of the number of attendees in a training session to the number of employees on the team. In another scenario, points may be awarded for attending in person, online or for replaying of a training audio or a video. In a further scenario, additional points may be awarded to a speaker's team or to a speaker drawing the largest audience whether online, in person or through replay.

By way of example, the UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the applications 103 may be any type of application that is executable at the UE 101, such as media player applications, social networking applications, calendar applications, content provisioning services, location-based service applications, navigation applications and the like. In one embodiment, one of the applications 103 at the UE 101 may act as a client for the evaluation platform 115 and may perform one or more functions associated with the functions of the evaluation platform 115 by interacting with the evaluation platform 115 over the networks 107-113.

By way of example, the sensors 105 may be any type of sensor. In certain embodiments, the sensors 105 may include, for example, a global positioning sensor for gathering location data (e.g., GPS), a network detection sensor for detecting wireless signals or receivers for different short-range communications (e.g., Bluetooth, WiFi, Li-Fi, near field communication etc.), temporal information, a camera/imaging sensor for gathering image data, an audio recorder for gathering audio data, and the like. In one scenario, the sensors 105 may include, light sensors, oriental sensors augmented with height sensor and acceleration sensor, tilt sensors, moisture sensors, pressure sensors, audio sensors (e.g., microphone), gaze tracking sensors etc. In one embodiment, the sensors 105 may cause gaze tracking of one or more users using one or more cameras and/or sensors directed at the user's eyes. In one scenario, the evaluation platform 115 may utilize the sensors of the virtual or augmented reality glasses device to detect whether the head movements and gaze of the one or more users match with the movement patterns of a reader. A reader's head movement and point of gaze follow the patterns of a reading task. Similarly, the evaluation platform 115 may detect head movements and point of gaze of one or more users to determine whether the movement follows the patterns of a reading task.

For illustrative purposes, the networks 107-113 may be any suitable wireline and/or wireless network, and be managed by one or more service providers. For example, telephony network 107 may include a circuit-switched network, such as the public switched telephone network (PSTN), an integrated services digital network (ISDN), a private branch exchange (PBX), or other like network. Wireless network 113 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 111 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Although depicted as separate entities, networks 107-113 may be completely or partially contained within one another, or may embody one or more of the aforementioned infrastructures. For instance, the service provider network 109 may embody circuit-switched and/or packet-switched networks that include facilities to provide for transport of circuit-switched and/or packet-based communications. It is further contemplated that networks 107-113 may include components and facilities to provide for signaling and/or bearer communications between the various components or facilities of system 100. In this manner, networks 107-113 may embody or include portions of a signaling system 7 (SS7) network, or other suitable infrastructure to support control and signaling functions.

In one embodiment, the evaluation platform 115 may be a platform with multiple interconnected components. The evaluation platform 115 may include multiple servers, intelligent networking devices, computing devices, components and corresponding software for calculating a training score by evaluating the developmental training activity performed by a user to generate a ranking. In addition, it is noted that the evaluation platform 115 may be a separate entity of the system 100, or included within the UE 101 (e.g., as part of the applications 103).

In one embodiment, the evaluation platform 115 may receive an input for specifying a developmental training activity associated with a user. In one scenario, the evaluation platform 115 may receive an input from a user (i.e. employer and/or manager) for a particular developmental training activity. In another scenario, the developmental training activity indicated by a user for other users may be based on user requirements, user progression etc.

In one embodiment, the evaluation platform 115 may identify a classification of the developmental training activity as a team activity, an individual activity, or a combination thereof. In one scenario, the evaluation platform 115 may cause a classification of the developmental training activity based on the characteristic and functionality of the training activity. For example, reading a book may be termed as an individual activity wherein users may be graded based on their reading pace, the number of pages read etc. On the other hand, a general discussion on the book may be termed as a team activity, wherein users may be graded for their participation, inputs, suggestions etc., for example, users reading together and brainstorming concepts to better serve customers. Such team activities creates a common ground between users to share thoughts and allows a common forum for users who might not have ever worked together to share ideas. In such manner, the one or more users may compete, collaborate, explore or express during a developmental training activity.

In one embodiment, the evaluation platform 115 may determine a weighting for the developmental training activity based on classification. In one scenario, the evaluation platform 115 may classify an activity wherein employees are reading books on emerging technologies and new devices as an important training activity. In another scenario, the evaluation platform 115 may classify an activity wherein employees are sharing and learning new strategies for technological advancements as a less significant training activity. The evaluation platform 115 may provide scores for completion of such classified training activities to cause a ranking of one or more users. The evaluation platform 115 may give higher scores to more significant training activity. In another embodiment, the evaluation platform 115 may calculate a training score for the user based on the weighting and the developmental training activity. For example, reading books on emerging technologies, or reading books on enhancing soft skills such as leadership, may be given more weightage compared to other books.

In one embodiment, the evaluation platform 115 may create the database 117 wherein the determined information, for example, training response data, contextual information, historical activity data, user productivity information, user progress information etc. may be stored. In one embodiment, the database 117 may store real-time and/or historical information of one or more users, the information may be any multiple types of information that can provide means for aiding in the content provisioning and sharing process.

According to exemplary embodiments, end user devices may be utilized to communicate over system 100 and may include any customer premise equipment (CPE) capable of sending and/or receiving information over one or more of networks 107-113. For instance, voice terminal may be any suitable plain old telephone service (POTS) device, facsimile machine, etc., whereas mobile device (or terminal) may be any cellular phone, radiophone, satellite phone, smart phone, wireless phone, or any other suitable mobile device, such as a personal digital assistant (PDA), pocket personal computer, tablet, customized hardware, etc. Further, computing device may be any suitable computing device, such as a VoIP phone, skinny client control protocol (SCCP) phone, session initiation protocol (SIP) phone, IP phone, personal computer, softphone, workstation, terminal, server, etc.

Figure 2:
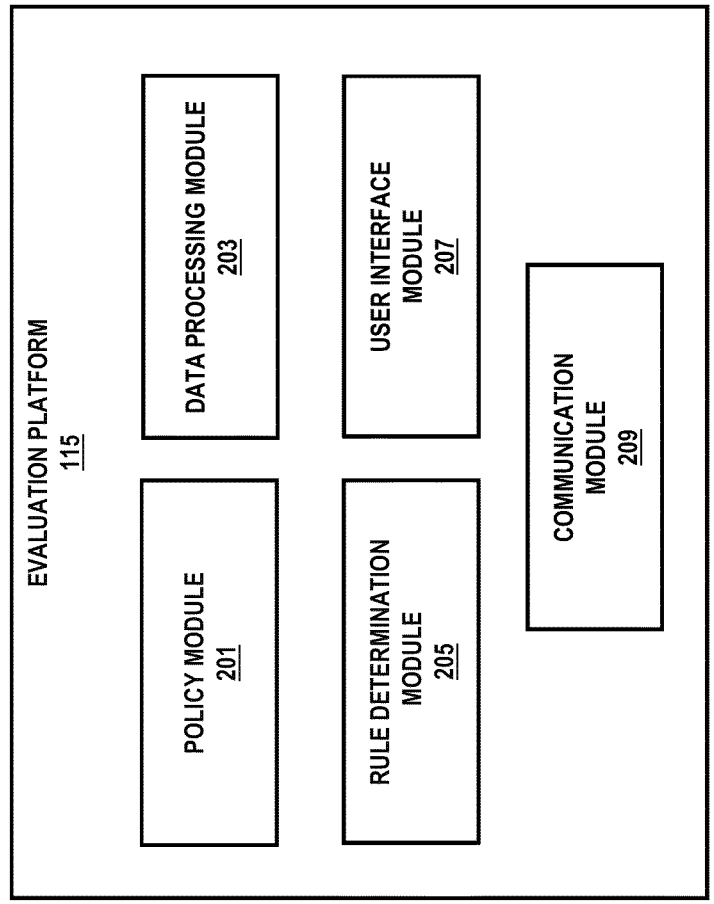
FIG. 2 is a diagram of the components of the evaluation platform 115, according to one embodiment.

FIG. 2 is a diagram of the components of the evaluation platform 115, according to one embodiment. By way of example, the evaluation platform 115 includes one or more components for calculating a training score by evaluating the developmental training activity performed by a user to generate a ranking. It is contemplated that the functions of these components may be combined in one or more components or performed by other components of equivalent functionality. In this embodiment, the evaluation platform 115 includes a policy module 201, a data processing module 203, a rule determination module 205, a user interface module 207, and a communication module 209.

In one embodiment, the policy module 201 may cause a developmental training activity for one or more users. Then, the policy module 201 may generate a training score based on a training response data of one or more users. In one scenario, a training response data is based on user productivity, user participation, quality of work, user progress, or a combination thereof. In another embodiment, the policy module 201 may determine one or more policies for converting the number of pages read, the number of books read, the reading pace, or a combination thereof into training scores based on a predetermined score formula. In one scenario, one or more users may be awarded additional scores for executing a selected training activity, exceeding the recommended training period, or a combination thereof. In a further embodiment, the policy module 201 may determine one or more policies for penalizing users in violation of the recommended training activity by decreasing their scores for incomplete training activity.

In one embodiment, the data processing module 203 may receive training response data associated with one or more users performing a collaborative training activity. In another embodiment, the data processing module 203 may process the contextual information for one or more users to select a training activity, a training group, or a combination thereof. In a further embodiment, the data processing module 203 may process training response data and/or historical activity data for one or more users to determine their skills, strength, weakness, or a combination thereof. The training activities and/or training groups may be further based upon such determination. In one scenario, the data processing module 203 may adapt a training activity for a user based on historical activity data to predict areas of required training, wherein historical activity data includes one or more developmental training activities previously performed by a user.

In one embodiment, the rule determination module 205 may evaluate and validate the training response data for generating a ranking based on the performance parameter. In another embodiment, the rule determination module 205 may calculate training score for one or more users based on the weighting and the developmental training activities. In a further embodiment, the rule determination module 205 may update the ranking information based on the performance parameter, the calculation, or a combination thereof. In one scenario, the updated ranking information enables an updated scoreboard indicating relative ranking of one or more users made accessible to other users via a network service. In another scenario, one or more users may be ranked by the number of points they have in a book club category, for example, points scored during a brown bag seminars may be included into the book club calculations.

In one embodiment, the user interface module 207 employs various application programming interfaces (APIs) or other function calls corresponding to the applications 103 of the UE 101, thus enabling the display of graphics primitives such as menus, data entry fields, etc., for generating the user interface elements. By way of example, the user interface module 207 generates the interface in response to APIs or other function calls corresponding to the browser application or web portal application of the UE 101, thus enabling the display of graphics primitives. In another embodiment, the user interface module 207 causes a presentation of a scoreboard indicating relative ranking of one or more users based on their training scores. In a further embodiment, the user interface module 207 causes a presentation of a graphical user interface to at least one user to assist during their participation in a developmental training activity. In another embodiment, the user interface module 207 may cause a presentation of training materials via at least one virtual or augmented reality and electronic displays (e.g., near-eye displays, head-mounted displays, wearable display etc.). The user interface module 207 may overlay the training materials on at least one virtual or augmented reality and electronic displays based, at least in part, on gaze tracking, head movement, etc.

In one embodiment, the communication module 209 executes various protocols and data sharing techniques for connecting at least one UE 101 to a secured network, whereby a web based application may be accessed by one or more users via the secured network service and is adapted for display on one or more mobile devices. The communication module 209 may be used to communicate commands, requests, data, etc. By way of example, the communication module 209 may be used to transmit a request from a UE 101 to the evaluation platform 115 for calculating a training score by evaluating the developmental training activity performed by a user to generate a ranking.

The above presented modules and components of the evaluation platform 115 can be implemented in hardware, firmware, software, or a combination thereof. Though depicted as a separate entity in FIG. 1, it is contemplated that the evaluation platform 115 may be implemented for direct operation by respective UE 101s. As such, the evaluation platform 115 may generate direct signal inputs by way of the operating system of the UE 101 for interacting with the applications 103. In another embodiment, one or more of the modules 201-209 may be implemented for operation by respective UE 101s, as an evaluation platform 115, or combination thereof. Still further, the evaluation platform 115 may be integrated for direct operation with services 107-13, such as in the form of a widget or applet, in accordance with an information and/or subscriber sharing arrangement. The various executions presented herein contemplate any and all arrangements and models.

Figure 3:
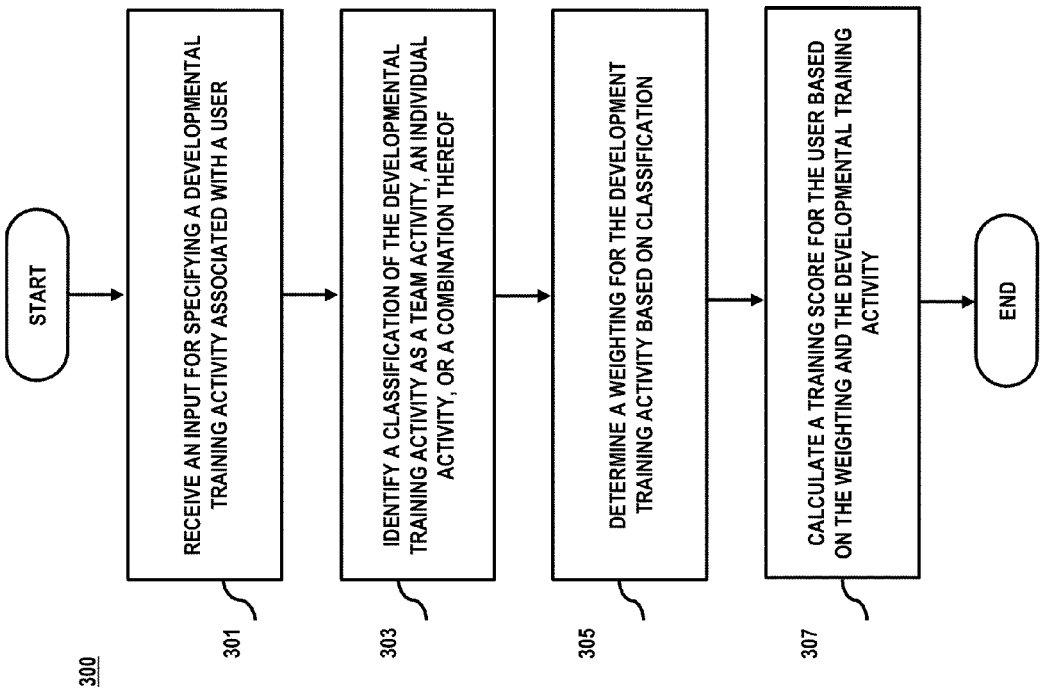
FIG. 3 is a flowchart of a process for calculating a training score by evaluating the developmental training activity performed by a user to generate a ranking, according to one embodiment.

FIG. 3 is a flowchart of a process for calculating a training score by evaluating the developmental training activity performed by a user to generate a ranking, according to one embodiment.

In step 301, the evaluation platform 115 receives an input for specifying a developmental training activity associated with a user, wherein the developmental training activity includes a reading activity, a lecturing activity, or a combination thereof. In one scenario, a user may be presented with certain content to read and/or listen to as a training activity, for example, a user may be provided with a book on cloud services or a video on telecommunication management. The evaluation platform 115 may monitor the performance score to such recommended training activity. In one scenario, the recommended training activity may be directed towards educational purposes, and identified skills for a user to be developed. The evaluation platform 115 may implement a feedback mechanism to assess the effectiveness of the recommended training activity.

In step 303, the evaluation platform 115 identifies a classification of the developmental training activity as a team activity, an individual activity, or a combination thereof. In one scenario, the evaluation platform 115 may classify reading a book or watching an educational video as an individual activity, wherein a user is given scores for completion of each level. In another scenario, the evaluation platform 115 may classify a discussion on a book as a team activity, wherein users are scored on their participation. In a further scenario, the evaluation platform 115 may classify a mentor program as a team activity, wherein the mentor may be given scores for assistance while the trainees are given scores for their involvement. Such classification of a developmental training activity is important for accurate score analysis.

In step 305, the evaluation platform 115 determines a weighting for the development training activity based on classification. In one embodiment, the evaluation platform 115 may determine a score factor for a developmental activity based on their importance. In one scenario, the evaluation platform 115 may determine that users may be awarded more points for reading a particular book or a particular article or a particular journal on client communication as compared to other books, articles, white papers, journals based on a realization that the customer service rendered has been regretful.

In step 307, the evaluation platform 115 calculates a training score for the user based on the weighting and the developmental training activity. In one embodiment, the weighting, the training score, or a combination thereof is further based on whether the development training activity is associated with a predetermined subject area. In one scenario, the evaluation platform 115 may determine weighting factors for each performance, wherein the performance of each user is compared to a predetermined performance range. The performance ranking may be derived from the relative performance scores. In another scenario, the test scores are used to indicate proficiency and understanding of a particular skill set. In one example embodiment, the evaluation platform 115 may determine to allocate certain training score depending on the developmental training activity:

| Training Category | Activity Type | Points Awarded |
|---|---|---|
| Book Club | Individual - per page | 1 point |
| | Group - per page | 1.5 point |
| Brown Bag/Seminar | Per 1 hour seminar | 60 point |
| Training | Per minute | 1 point |
| College/University Course | Per 10 week course | 2000 point |
| Bonus | Ranked per activity | 2 |
| Bookmark | | −250 point |
| Trade/Swap Bookmarks | | −250 point |

In one scenario, a user may be awarded 1 point per page of the reading assignment. On the other hand, all members of a group may be awarded 1.5 points for every page read as a group. In another scenario, users may be awarded different points for different category of training, for example, 60 points may be awarded to a user for completing a brown bag seminar, 2000 points may be awarded to a user for completing a recommended college course etc. Then, the evaluation platform 115 may rank one or more users based on their total points. In a further scenario, a user may exchange his points for a bookmark, for example, a user may be awarded a bookmark for 250 points, subsequently the evaluation platform 115 may deduct 250 points from the users account.

Figure 4:
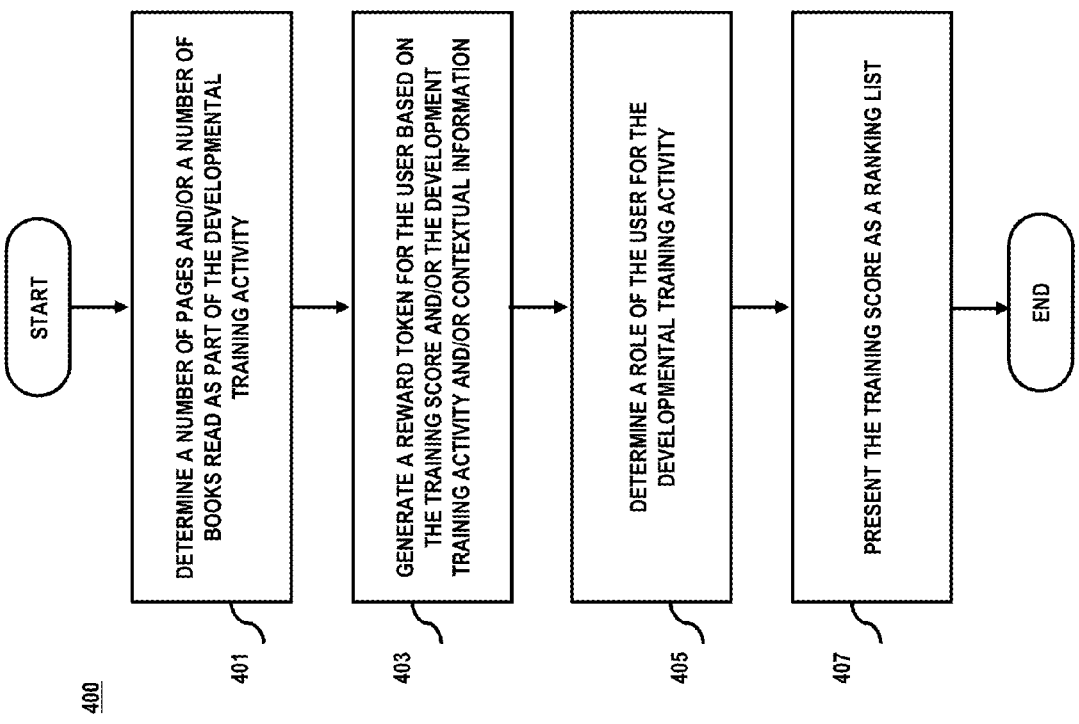
FIG. 4 is a flowchart of a process for determining a weighting and/or a training score to generate a reward token for a user, and presenting the training score as a ranking list, according to one embodiment.

FIG. 4 is a flowchart of a process for determining a weighting and/or a training score to generate a reward token for a user, and presenting the training score as a ranking list, according to one embodiment.

In step 401, the evaluation platform 115 determines a number of pages, a number of books, or a combination thereof read as part of the developmental training activity, wherein the weighting, the training score, or a combination thereof is further based on the number of pages, the number of books, or a combination thereof. In one scenario, the evaluation platform 115 may recommend a reading activity for one or more users, wherein a particular book on cloud computing is endorsed. The evaluation platform 115 may award scores for each page of the book read by the users. The evaluation platform 115 may also acknowledge the reading pace of one or more users. In another scenario, the evaluation platform 115 may recommend numerous books for one or more users. The users may be granted additional points for completing a book. In a further scenario, users may be granted additional point in a team activity if all the users of the team complete a book or certain portion of the book.

In step 403, the evaluation platform 115 generates at least one reward token for the user based on the training score, the development training activity, contextual information, or a combination thereof. In one scenario, the evaluation platform 115 may motivate users by offering fun rewards for completed milestones and important events. In one example embodiment, the evaluation platform 115 may reward users with additional points for every page read if they read within a team to encourage collaboration. In one scenario, the evaluation platform 115 may create bookmarks to reward employees for reading and moving to another level of the developmental training. In another scenario, the evaluation platform 115 may create badges, leaderboards, newsletter, testimonials, or a combination thereof to motivate user to continue their training activity. For example, the evaluation platform 115 may share the thoughts of other team members on certain books along with ranking information in a newsletter. In a further scenario, the evaluation platform 115 may reward one or more users by allowing them to redeem their points for certain good and/or services. In one example embodiment, an employee at XYZ Company may obtain enough points to garner him/her a free one-month unlimited wireless data plan, whereupon the cloud server that administers the point calculations may also grant the free upgrade.

In step 405, the evaluation platform 115 determines a role of the user for the developmental training activity, wherein the development training activity is classified as a team activity. In one embodiment, the weighting, the training score, or a combination thereof is further based on the role. In one scenario, a user leading a team and encouraging the team to continue learning even after surpassing developmental training benchmark may be awarded additional scores for his/her important function. In another scenario, a user contributing the most in a team event might be given additional point for his/her important function.

In step 407, the evaluation platform 115 presents the training score as a ranking list, wherein the ranking list is organized by an individual, a team, a supervisor of the team, or a combination thereof. In one scenario, the evaluation platform 115 may monitor a user performance to generate a score to cause a ranking. In one scenario, the evaluation platform 115 may cause a notification (e.g. emails, newsletter, messages etc.) to one or more users with regards to ranking. In one example embodiment, the evaluation platform 115 may send a newsletter with ranking and scores of one or more users periodically, based on a pre-determined schedule, based on demands from one or more users, or a combination thereof.

Figure 5:
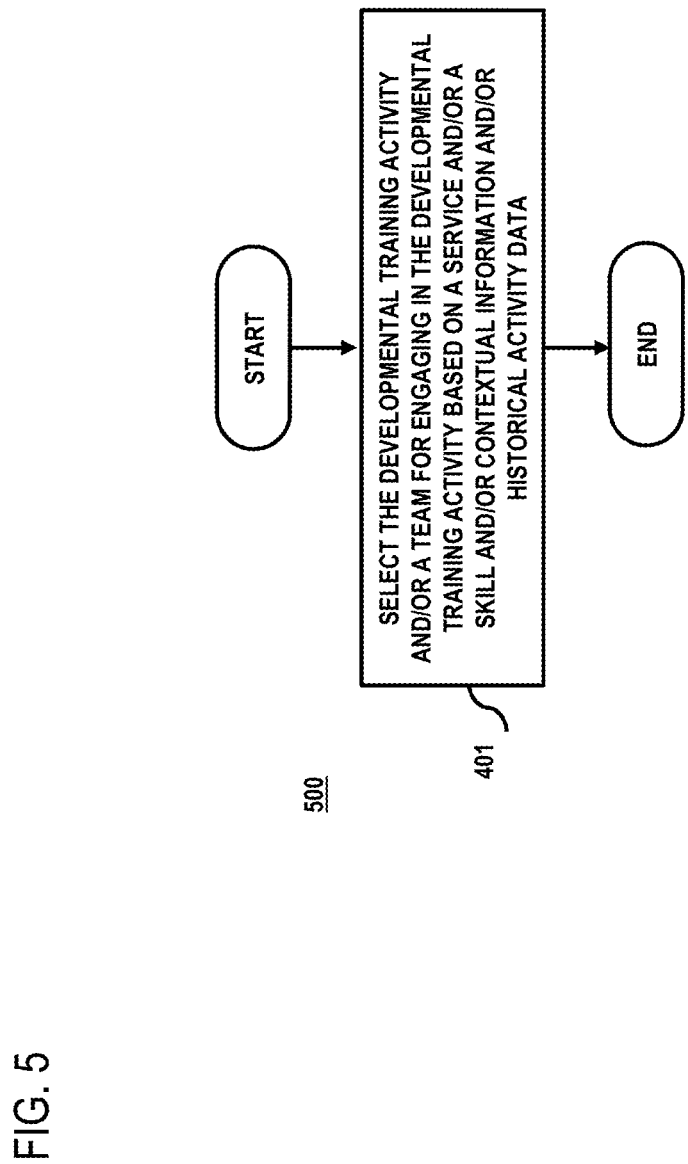
FIG. 5 is a flowchart of a process for selecting one or more users and a developmental training activity for the one or more users based on user attributes, according to one embodiment.

FIG. 5 is a flowchart of a process for selecting one or more users and a developmental training activity for the one or more users based on user attributes, according to one embodiment.

In step 501, the evaluation platform 115 selects the developmental training activity, a team for engaging in the developmental training activity, or a combination thereof based on a service, a skill, contextual information, historical activity data, or a combination thereof. In one scenario, the evaluation platform 115 may process the contextual information of one or more users to determine a weakness of a user and may provide a suitable training activity.

Figure 6:
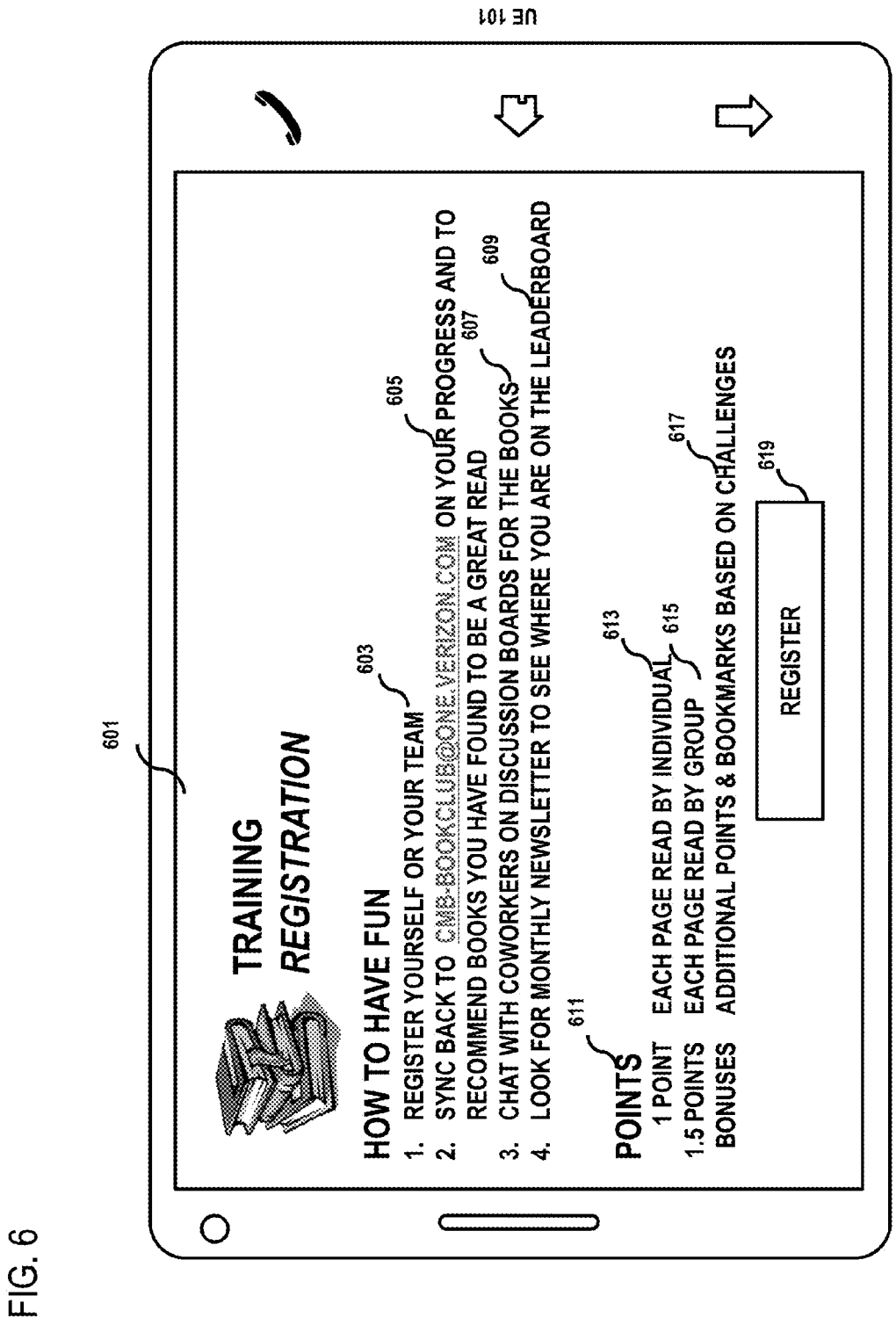
FIG. 6 is a user interface diagram for registration to a developmental training activity, according to one embodiment.

FIG. 6 is a user interface diagram for registration to a developmental training activity, according to one embodiment. In one scenario, the evaluation platform 115 may cause a presentation of a user interface [601] to one or more users for registering to a developmental training program. The one or more users may be provided with several information regarding the training program, for example, the participant(s) to be registered [603], the procedure to monitor one's progress and recommend materials determined to be important for skill development [605], the opportunity to discuss the materials with other users [607], and the possibility to check one's ranking in the monthly newsletter [609]. In another scenario, the one or more users may be notified on the scores granted for their efforts dedicated to the training program [611]. For example, the evaluation platform 115 may allot 1 point to a user for each page read of the recommended book [613]. The evaluation platform 115 may allot 1.5 points to one or more users for each page read by a group as a whole [615]. In addition, the evaluation platform 115 may grant additional points and bookmarks to one or more users based on completion of the assigned challenges [617]. In one scenario, a user may initiate the registration process by clicking the register button [619].

Figure 7:
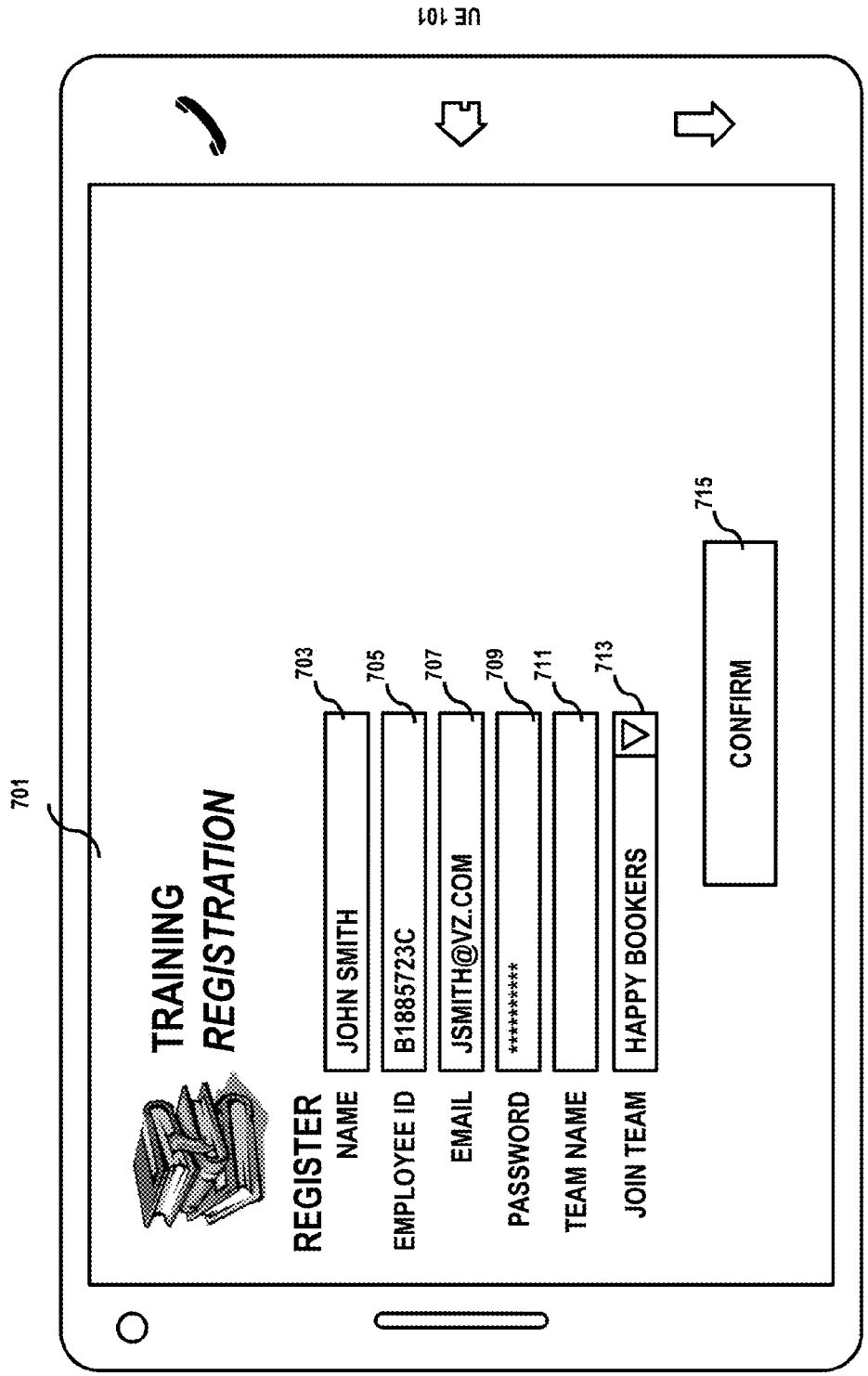
FIG. 7 is a user interface diagram wherein a user may register himself/herself to a developmental training activity by entering their personal information, according to one embodiment.

FIG. 7 is a user interface diagram wherein a user may register himself/herself to a developmental training activity by entering their personal information, according to one embodiment. In one scenario, the evaluation platform 115 may navigate a user to user interface element [701] wherein a user may enter his/her name [703], employee identification [705], email address [707], password [709], and team name [711], to register for a training program. In another scenario, a user may select a team from the join team tablet [713] if he/she does not have a team. The user may press confirm upon entering the required descriptions. Then, the evaluation platform 115 may cause a user verification process based, at least in part, on predefined values, wherein predefined values include, at least in part, a preset username, employee identification, one or more identifiers, other authentication mechanisms, or a combination thereof. In a further scenario, the evaluation platform 115 may process UE 101 information, wireless device identifier information, user credentials, or a combination thereof associated with one or more users to determine user performance or a group performance during a training session. In one example embodiment, the evaluation platform 1115 may determine which user reads the training material or which group has performed the most training based, at least in part, on the processing.

Figure 8:
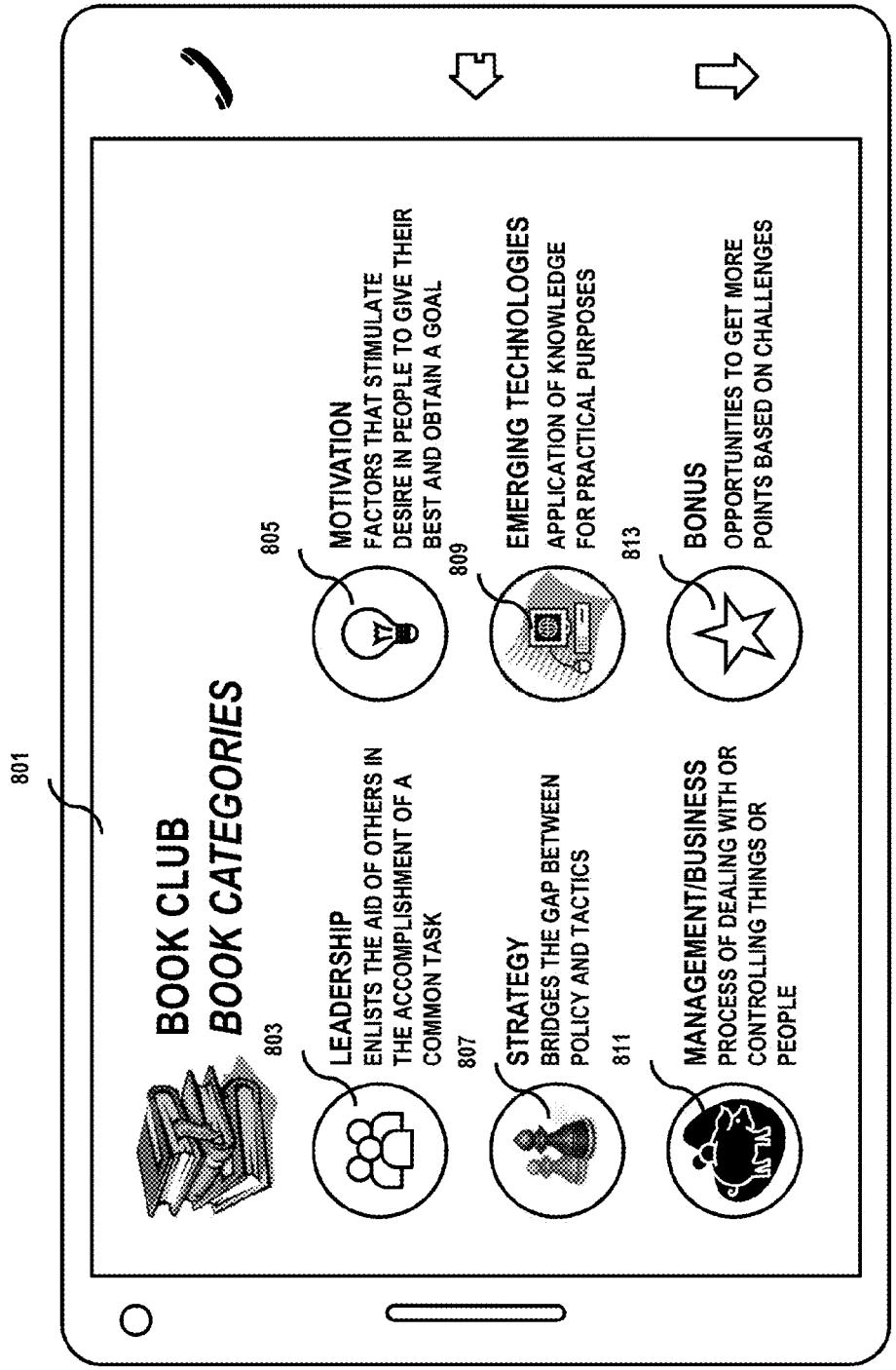
FIG. 8 is a user interface diagram that represents categories of one or more books in a book club, according to one embodiment.

FIG. 8 is a user interface diagram that represents categories of one or more books in a book club, according to one embodiment. In one scenario, the evaluation platform 115 may create a task of reading books to empower employees to develop ideas on ways to better serve the customers. Such task may be created based on at least one input, and the hours spent reading the books count towards the developmental training. The evaluation platform 115 may divide the books into several categories, for example, leadership [803], motivation [805], strategy [807], emerging technologies [809], management/business [811], and bonus [813]. In one scenario, the leadership category [803] may enlist books on aiding of others in the accomplishment of a common task. In one scenario, the motivation category [805] may include books that encourage the readers to give their best in obtaining a certain goal. In one scenario, the strategy category [807] includes books that bridge the gap between the policies and tactics. In one scenario, the emerging technologies category [809] includes books on application of knowledge for practical purposes on emerging technologies. In one scenario, the management/business category [811] includes books on people management. In one scenario, the bonus category [813] includes additional books that may gather more scores for the users. The users may either select the books per their detriment or may be assigned one or more books.

Figure 9:
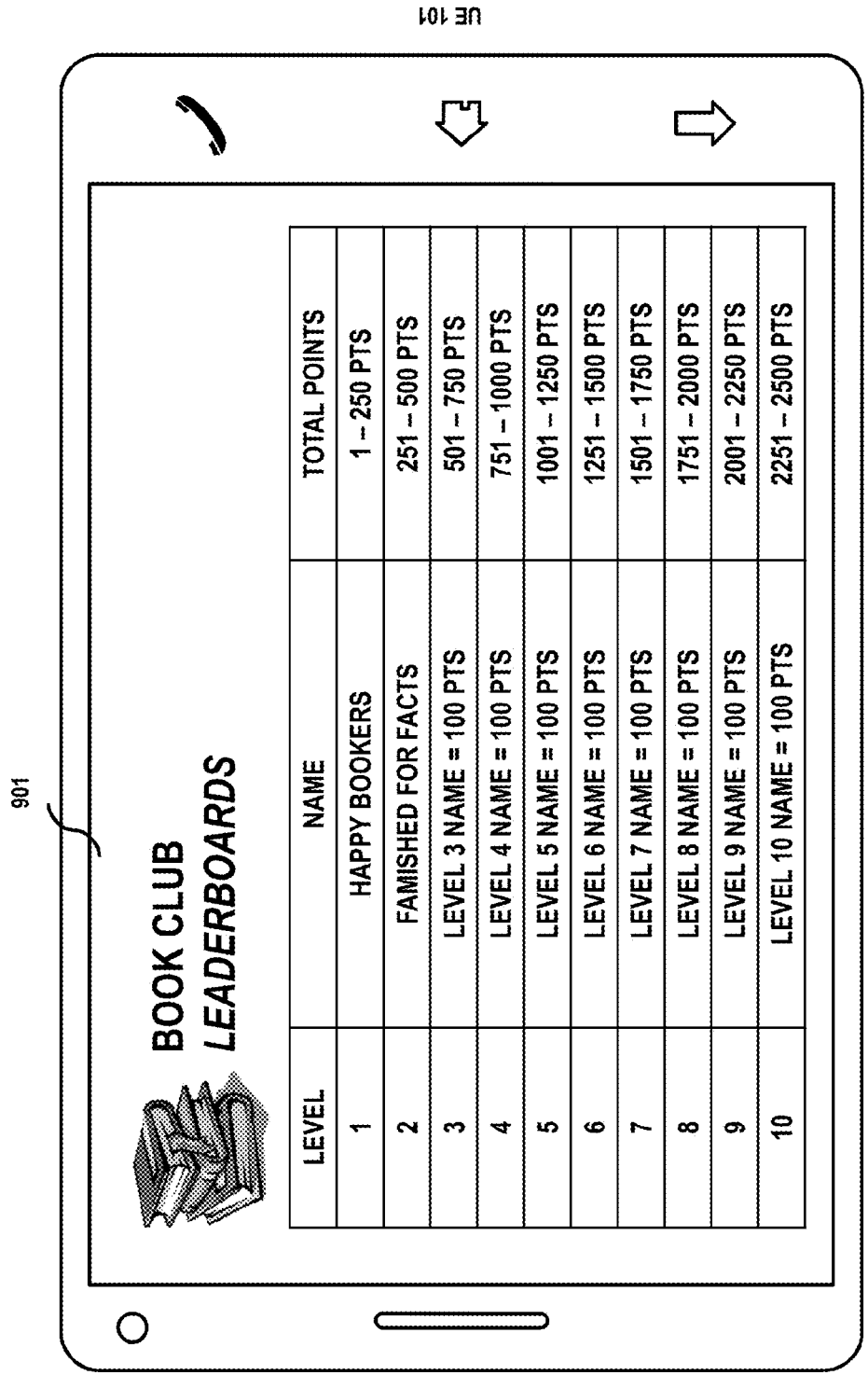
FIG. 9 is a user interface diagram that represents a scoreboard indicating relative ranking of one or more users, according to one embodiment.

FIG. 9 is a user interface diagram that represents a scoreboard indicating relative ranking of one or more users, according to one embodiment. In one scenario, the evaluation platform 115 may present a user with information on points for one or more training [901]. The higher the level, the higher is the point [901]. In one scenario, the evaluation platform 115 may determine the pages read, or completion of at least one training tasks. Then, the evaluation platform 115 may transmit the information for calculation of the scores, wherein the number of pages read by a user or the training tasks completed by a user is converted into points. Subsequently, the evaluation platform 115 may update the ranking information for the user in the scoreboard. In another scenario, the evaluation platform 115 may determine users in violation of the training and may penalize the users for incomplete training activity by decreasing their points. In another scenario, the scoreboard may show the top team, or the top readers in each team, thereby motivating aggressive reading and competition between the teams and/or within the team. In a further scenario, as an incentive users with higher points may be given an opportunity to edit the comments of the users with lower points. Correspondingly, a user with the highest points may receive the first notification regarding the questions on the discussion board, and may also be given an opportunity to respond to those questions before any other users.

Figure 10:
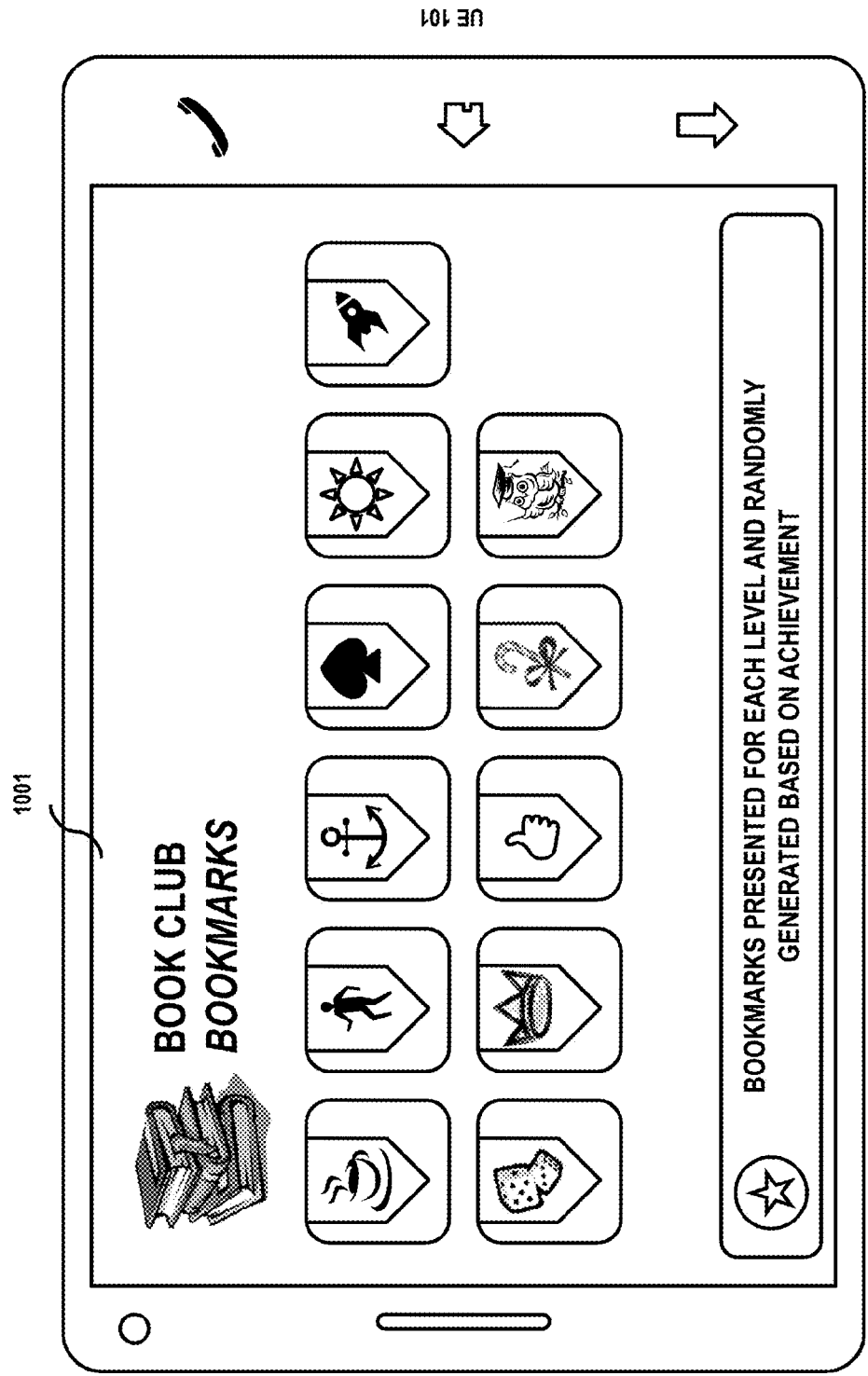
FIG. 10 is a user interface diagram that represents one or more bookmarks presented to users for completing the assigned developmental training activity, according to one embodiment.

FIG. 10 is a user interface diagram that represents one or more bookmarks presented to users for completing the assigned developmental training activity, according to one embodiment. In one scenario, the evaluation platform 115 may award a user with a bookmark [1001] for completion of each level of the developmental training activity as an immediate and tangible demonstration of user's learning progress. In another scenario, the evaluation platform 115 may award a user with a bookmark [1001] for his/her contribution to the developmental training program. The bookmarks are fun items for users to collect, and is a creative way to share progress with other users. In a further scenario, bookmarks can be used as a reward system for users joining the training program at a latter phase because scoreboards can be demotivating for them. The bookmarks documents achievements for users, for example, first user to read a book or provide training time calculation for existing recommended book. In one embodiment, the evaluation platform 115 may create limited offer bookmarks to commemorate special events, or may create premier bookmarks for reading books on assisting in bridging learning gaps such as in cloud, security or new technologies. In one scenario, a bookmark may be valid for a year, for example, a bookmark gained in November may carry over into next year. In another scenario, one or more points may be traded in for bookmarks, and one or more bookmarks may be traded in for customer milestones.

The computer system 1100 may be coupled via the bus 1101 to a display 1111, such as a cathode ray tube (CRT), liquid crystal display, active matrix display, or plasma display, for displaying information to a computer user. An input device 1113, such as a keyboard including alphanumeric and other keys, is coupled to the bus 1101 for communicating information and command selections to the processor 1103. Another type of user input device is a cursor control 1115, such as a mouse, a trackball, or cursor direction keys, for communicating direction information and command selections to the processor 1103 and for controlling cursor movement on the display 1111.

According to an embodiment of the invention, the processes described herein are performed by the computer system 1100, in response to the processor 1103 executing an arrangement of instructions contained in main memory 1105. Such instructions can be read into main memory 1105 from another computer-readable medium, such as the storage device 1109. Execution of the arrangement of instructions contained in main memory 1105 causes the processor 1103 to perform the process steps described herein. One or more processors in a multi-processing arrangement may also be employed to execute the instructions contained in main memory 1105. In alternative embodiments, hard-wired circuitry may be used in place of or in combination with software instructions to implement the embodiment of the invention. Thus, embodiments of the invention are not limited to any specific combination of hardware circuitry and software.

Figure 11:
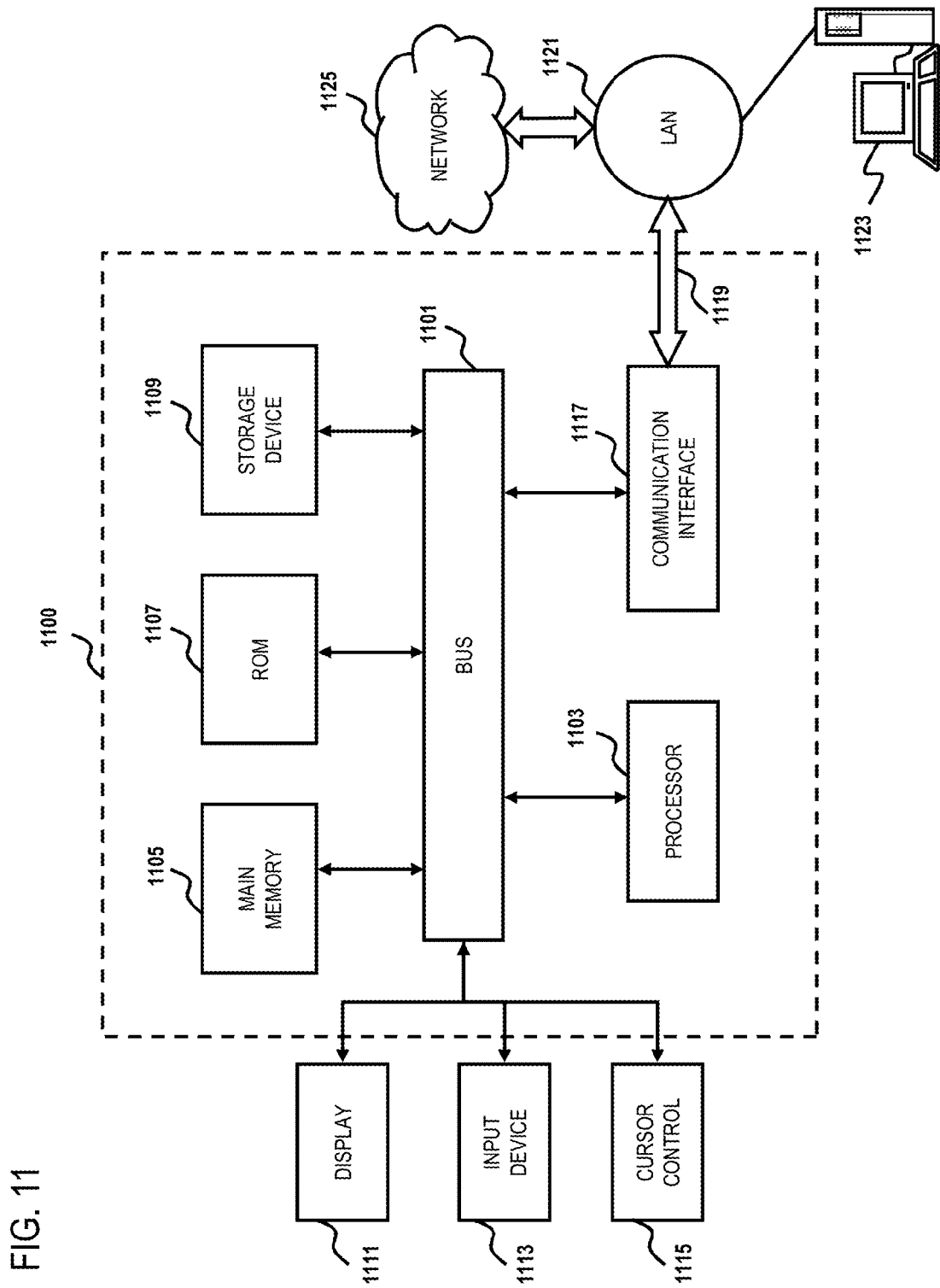
FIG. 11 is a diagram of a computer system that can be used to implement various exemplary embodiments.

The computer system 1100 also includes a communication interface 1117 coupled to bus 1101. The communication interface 1117 provides a two-way data communication coupling to a network link 1119 connected to a local network 1121. For example, the communication interface 1117 may be a digital subscriber line (DSL) card or modem, an integrated services digital network (ISDN) card, a cable modem, a telephone modem, or any other communication interface to provide a data communication connection to a corresponding type of communication line. As another example, communication interface 1117 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1117 sends and receives electrical, electromagnetic, or optical signals that carry digital data streams representing various types of information. Further, the communication interface 1117 can include peripheral interface devices, such as a Universal Serial Bus (USB) interface, a PCMCIA (Personal Computer Memory Card International Association) interface, etc. Although a single communication interface 1117 is depicted in FIG. 11, multiple communication interfaces can also be employed.

The network link 1119 typically provides data communication through one or more networks to other data devices. For example, the network link 1119 may provide a connection through local network 1121 to a host computer 1123, which has connectivity to a network 1125 (e.g. a wide area network (WAN) or the global packet data communication network now commonly referred to as the "Internet") or to data equipment operated by a service provider. The local network 1121 and the network 1125 both use electrical, electromagnetic, or optical signals to convey information and instructions. The signals through the various networks and the signals on the network link 1119 and through the communication interface 1117, which communicate digital data with the computer system 1100, are exemplary forms of carrier waves bearing the information and instructions.

The computer system 1100 can send messages and receive data, including program code, through the network(s), the network link 1119, and the communication interface 1117. In the Internet example, a server (not shown) might transmit requested code belonging to an application program for implementing an embodiment of the invention through the network 1125, the local network 1121 and the communication interface 1117. The processor 1103 may execute the transmitted code while being received and/or store the code in the storage device 1109, or other non-volatile storage for later execution. In this manner, the computer system 1100 may obtain application code in the form of a carrier wave.

The term "computer-readable medium" as used herein refers to any medium that participates in providing instructions to the processor 1103 for execution. Such a medium may take many forms, including but not limited to non-volatile media, volatile media, and transmission media. Non-volatile media include, for example, optical or magnetic disks, such as the storage device 1109. Volatile media include dynamic memory, such as main memory 1105. Transmission media include coaxial cables, copper wire and fiber optics, including the wires that comprise the bus 1101. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 12:
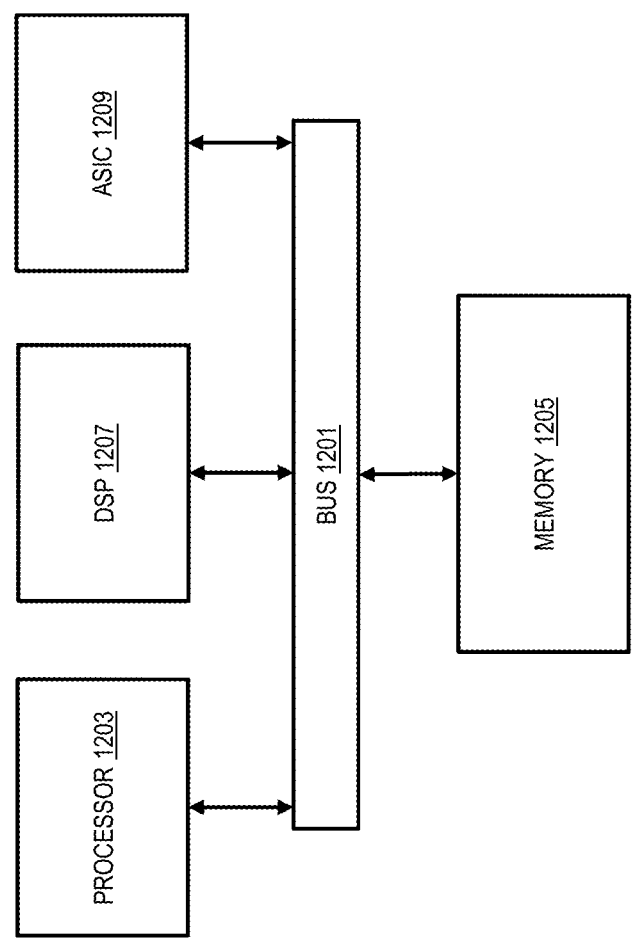
FIG. 12 is a diagram of a chip set that can be used to implement various exemplary embodiments.

FIG. 12 illustrates a chip set 1200 upon which an embodiment of the invention may be implemented. Chip set 1200 is programmed to present a slideshow as described herein and includes, for instance, the processor and memory components described with respect to FIG. 12 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1200, or a portion thereof, constitutes a means for performing one or more steps of FIGS. [3-5].

In one embodiment, the chip set 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to controlling a set-top box based on device events. The memory 1205 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:

receiving, by one or more server devices, an input for specifying a developmental training activity associated with a user;

classifying, by the one or more server devices, the developmental training activity as at least one team activity, and a plurality of individual activities;

determining, by the one or more server devices, a weighting for the development training activity based on the classification, the weighting comprising different score factors associated with each of the plurality of individual activities and the at least one team activity;

assigning, by the one or more server devices, the user to a team that includes at least one other user;

assigning, by the one or more server devices, a distinct role, from a plurality of distinct roles, to the user and the at least one other user, each of the plurality of distinct roles being associated with different individual activities of the plurality of individual activities;

calculating, by the one or more server devices, a training score for the user, the at least one other user, and the team based on the different score factors, performance of the individual activities by the user and the at least one other user, and performance of the at least one team activity by the team; and output, by the one or more server devices, the training score for display on a display device.

2. The method of claim 1, wherein the developmental training activity includes a reading activity, a lecturing activity, or a combination thereof.

3. The method of claim 1, further comprising:
determining a number of pages, a number of books, or a combination thereof read as part of the developmental training activity,
wherein the weighting, the training score, or a combination thereof is further based on the number of pages, the number of books, or a combination thereof.

4. The method of claim 1, further comprising:
generating at least one reward token for the user based on the training score, the development training activity, contextual information, or a combination thereof.

5. The method of claim 1, wherein the weighting, the training score, or a combination thereof is further based on whether the development training activity is associated with a predetermined subject area, the weighting, the training score, or the combination thereof being higher when the development training activity is associated with the predetermined subject area than when the development training activity is not associated with the predetermined subject area.

6. The method of claim 1, further comprising:
presenting the training score as a ranking list,
wherein the ranking list is organized by indicating a relative ranking of scores associated with an individual, a team, a supervisor of the team, or a combination thereof.

7. The method of claim 1, further comprising:
selecting the developmental training activity, the team for engaging in the developmental training activity, or a combination thereof based on a service, a skill, contextual information, historical activity data, or a combination thereof, of the selected team, as compared to one or more other teams.

8. The method of claim 1, further comprising:
determining that the user, the at least one other user, or the team has violated at least one policy of the training activity; and
penalizing the training score of the user, the at least one other user, and the team, in response to the user, the at least one other user, or the team violating the at least one policy.

9. An apparatus comprising a processor configured to:
receive an input for specifying a developmental training activity associated with a user;
classify the developmental training activity as at least one team activity, and a plurality of individual activities and at least one team activity;
determine a weighting for the development training activity based on the classification, the weighting comprising different score factors associated with each of the plurality of individual activities and the at least one team activity;
assign the user to a team that includes at least one other user;
assign a first role, from the plurality of distinct roles, corresponding to the developmental training activity, to the user and a second role, from the plurality of distinct roles, to the at least one other user;
assign a distinct role, from a plurality of distinct roles, to each of the user and the at least one other user, each of the plurality of distinct roles being associated with different individual activities of the plurality of individual activities;
calculate a training score for the user, the at least one other user, and the team based on the different score factors, performance of the individual activities by the user and the at least one other user, and performance of the at least one team activity by the team; and
output the training score on a display device.

10. The apparatus of claim 9, wherein the developmental training activity includes a reading activity, a lecturing activity, or a combination thereof.

11. The apparatus of claim 9, further comprising:
determine a number of pages, a number of books, or a combination thereof read as part of the developmental training activity,
wherein the weighting, the training score, or a combination thereof is further based on the number of pages, the number of books, or a combination thereof.

12. The apparatus of claim 9, further comprising:
generate at least one reward token for the user based on the training score, the development training activity, contextual information, or a combination thereof.

13. The apparatus of claim 9, wherein the weighting, the training score, or a combination thereof is further based on whether the development training activity is associated with a predetermined subject area, the weighting, the training score, or the combination thereof being higher when the development training activity is associated with the predetermined subject area than when the development training activity is not associated with the predetermined subject area.

14. The apparatus of claim 9, further comprising:
present the training score as a ranking list,
wherein the ranking list is organized by indicating a relative ranking of an individual, a team, a supervisor of the team, or a combination thereof.

15. The apparatus of claim 9, further comprising:
select the developmental training activity, the team for engaging in the developmental training activity, or a combination thereof based on a service, a skill, contextual information, historical activity data, or a combination thereof, of the selected team, as compared to one or more other teams.

16. The apparatus of claim 9, further comprising:
determine that the user, the at least one other user, or the team has violated at least one policy of the training activity; and
penalize the training score of the user, the at least one other user, and the team, in response to the user, the at least one other user, or the team violating the at least one policy.

17. A system comprising a processor to:
receive an input for specifying a developmental training activity associated with a user;
classify the developmental training activity as at least one team activity, and a plurality of individual activities and at least one team activity;
determine a weighting for the development training activity based on the classification, the weighting comprising different score factors associated with each of the plurality of individual activities and the at least one team activity;
assign the user to a team that includes at least one other user;
assign a distinct role, from a plurality of distinct roles, to each of the user and the at least one other user, each of the plurality of distinct roles being associated with different individual activities of the plurality of individual activities;
calculate a training score for the user, the at least one other user, and the team, based on the different score factors, performance of the individual activities by the user and the at least one other user, and performance of the at least one team activity by the team; and output the training score on a display device.

18. The system of claim 17, wherein the processor is to:

determine a number of pages, a number of books, or a combination thereof read as part of the developmental training activity, wherein the weighting, the training score, or a combination thereof is further based on the number of pages, the number of books, or a combination thereof.

19. The system of claim 17, wherein the processor is to:

generate at least one reward token for the user based on the training score, the development training activity, contextual information, or a combination thereof.

20. The system of claim 17, wherein the processor is to:

determine that the user, the at least one other user, or the team has violated at least one policy of the training activity; and penalize the training score of the user, the at least one other user, and the team, in response to the user, the at least one other user, or the team violating the at least one policy.

\* \* \* \* \*